United States Patent [19]
Greig

[11] 3,865,949
[45] Feb. 11, 1975

[54] PROCESS OF TREATMENT
[75] Inventor: Margaret E. Greig, Kalamazoo, Mich.
[73] Assignee: The Upjohn Company, Kalamazoo, Mich.
[22] Filed: June 14, 1974
[21] Appl. No.: 479,213

Related U.S. Application Data
[63] Continuation-in-part of Ser. No. 384,819, Aug. 2, 1973, abandoned, which is a continuation of Ser. No. 258,353, May 31, 1972, abandoned.

[52] U.S. Cl. ................................................. 424/317
[51] Int. Cl. ............................................ A61k 27/00
[58] Field of Search ..................................... 424/317

[56] References Cited
UNITED STATES PATENTS
3,452,079  6/1969  Shen et al. ......................... 424/317

OTHER PUBLICATIONS
Chem. Abst., Vol. 64, 5005e (1966).

Primary Examiner—Stanley J. Friedman
Attorney, Agent, or Firm—John J. Killinger; Roman Saliwanchik

[57] ABSTRACT
A process for the therapeutic and prophylactic trate-ment of allergy by the systemic administration of a compound of the formula:

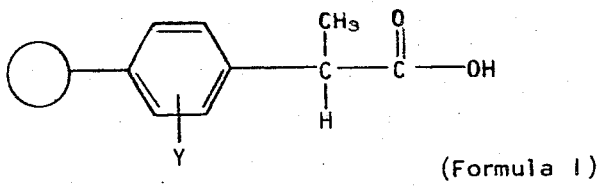

(Formula 1)

wherein

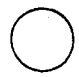

is cyclohexane or

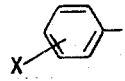

and X and Y can be the same or different and are hydrogen, fluoro, chloro, bromo, alkyl or from 1 to 8 carbon atoms, inclusive, or alkoxy of from 1 to 8 carbon atoms, inclusive, and the pharmacologically acceptable salts thereof in association with a pharmaceutical carrier.

5 Claims, No Drawings

PROCESS OF TREATMENT

CROSS REFERENCE TO RELATED APPLICATIONS

This application is a continuation-in-part of application Ser. No. 384,819 filed Aug. 2, 1973, which in turn is a continuation of application Ser. No. 258,353 filed May 31, 1972, both are now abandoned.

BRIEF DESCRIPTION OF THE INVENTION

This invention relates to a novel method for therapeutic and prophylactic treatment of allergic conditions by the systemic administration of a compound of the Formula 1 to a human or animal subject.

DETAILED DESCRIPTION OF THE INVENTION

The compounds of the Formula 1 are old compounds known in the art. The compounds are depicted in the protonated or acid form, however, for the purposes of the instant invention the proton can be replaced by any pharmacologically acceptable cation.

The compounds have optical isomerism and for the purposes of the instant invention the $d$ and $dl$ forms are preferred.

The compositions of the present invention are presented for administration to humans and animals in unit dosage forms, such as tablets, capsules, pills, powders, granules, sterile parenteral solutions or suspensions, and oral solutions or suspensions, and oil-in-water and water-in-oil emulsions containing suitable quantities of the compound of Formula 1. Another route of administration is by inhalation into the lung by means of an aerosol or powder for insufflation.

For oral administration either solid or fluid unit dosage forms can be prepared. For preparing solid compositions such as tablets, the compound of Formula 1 is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. Capsules are prepared by mixing the compound with an inert pharmaceutical diluent and filling the mixture into a hard gelatin capsule of appropriate size. Soft gelatin capsules are prepared by machine encapsulation of a slurry of the compound with an acceptable vegetable oil, light liquid petrolatum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydro-alcoholic (ethanol) vehicle with suitable sweeteners such as sugar and saccharin, together with an aromatic flavoring agent.

Suspensions can be prepared with a syrup vehicle with the aid of a suspending agent such as acacia, tragacanth, methylcellulose and the like.

For parenteral administration, fluid unit dosage forms are prepared utilizing the compound and a sterile vehicle, water being preferred. The compound, depending on the vehicle and concentration used, can be either suspended or dissolved in the vehicle. In preparing solutions the compound can be dissolved in water for injection and filter sterilized before filling into a suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the liquid prior to use. Parenteral suspensions are prepared in substantially the same manner except that the compound is suspended in the vehicle instead of being dissolved and sterilization cannot be accomplished by filtration. The compound can be sterilized by exposure to ethylene oxide before suspending in the sterile vehicle. Advantageously, a surfactant or wetting agent is included in the composition to facilitate uniform distribution of the compound.

Compositions for inhalation are of three basic types: (1) a powder mixture preferably micro-pulverized; (2) an aqueous solution to be sprayed with a nebulizer; and (3) an aerosol with volatile propellant in a pressurized container.

The powders are quite simply prepared by mixing a compound of the formula with a solid base which is compatible with lung tissue, preferably lactose. The powders are packaged in a device adapted to emit a measured amount of powder when inhaled through the mouth.

Aqueous solutions are prepared by dissolving the compound of the Formula 1 in water and adding salt to provide an isotonic solution and buffering to a pH compatible with inhalation. The solutions are dispersed in a spray device or nebulizer and sprayed into the mouth while inhaling.

Aerosols are prepared by dissolving a compound of the Formula 1 in water or ethanol and mixing with a volatile propellant and placing in a pressurized container having a metering valve to release a predetermined amount of material.

The term "unit dosage form", as used in the specification and claims, refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular effect to be achieved and (b) the limitations inherent in the art of compounding such an active material for use in humans and animals, as disclosed in detail in this specification, these being features of the present invention. Examples of suitable unit dosage forms in accord with this invention are tablets, capsules, pills, suppositories, powder packets, granules, wafers, cachets, teaspoonfuls, tablespoonfuls, dropperfuls, ampuls, vials, aerosols with metered discharges, segregated multiples of any of the foregoing, and other forms as herein described.

The dosage of the compound for treatment depends on the route of administration. A dosage schedule of from about 5 to 200 mg. in a single dose administered orally, parenterally or by inhalation, embraces the effective range for preventing allergic attack for which the compositions are effective. The dosage to be administered is repeated up to 4 times daily.

The administration of the compositions of the present invention to humans and animals provides a method for the prophylactic treatment of allergy or all anaphylactic reactions of a reagin or non-reagin mediated nature. That is to say, these compositions when administered to a sensitized individual prior to the time that the individual comes into contact with substances (antigens), to which he is allergic, will prevent the allergic reaction which would otherwise occur.

For example, the process can be used for prophylactic treatment of such chronic conditions as bronchial asthma, allergic rhinitis, food allergy, hay fever, urticaria, and auto-immune diseases.

EXAMPLE 1

A lot of 10,000 tablets, each containing 20 mg. of 3-fluoro-4-phenyl-hydratropic acid is prepared from the following types and amounts of ingredients:

| | |
|---|---|
| 3-fluoro-4-phenyl-hydratropic acid | 200 gm. |
| Dicalcium phosphate | 1,500 gm. |
| Methcellulose, U.S.P. (15 cps.) | 60 gm. |
| Talc | 150 gm. |
| Corn Starch | 200 gm. |
| Calcium stearate | 12 gm. |

The compound and dicalcium phosphate are mixed well, granulated with 7.5 percent solution of methylcellulose in water, passed through a No. 8 screen and dried carefully. The dried granules are passed through a No. 12 screen, mixed thoroughly with the talc, starch and magnesium stearate, and compressed into tablets.

EXAMPLE 2

One thousand two-piece hard gelatin capsules, each containing 30 mg. of 3-fluoro-4-phenyl-hydratropic acid are prepared from the following types and amounts of ingredients:

| | |
|---|---|
| 3-fluoro-4-phenyl-hydratropic acid | 30 gm. |
| Talc | 100 gm. |
| Magnesium stearate | 10 gm. |

The ingredients are mixed well and filled into capsules of the proper size.

Capsules so prepared are useful in preventing attacks of bronchial asthma at a dose of one capsule every 6 hours.

EXAMPLE 3

One thousand tablets, each containing 50 mg. of 3-fluoro-4-phenyl-hydratropic acid are made from the following types and amounts of ingredients:

| | |
|---|---|
| 3-fluoro-4-phenyl-hydratropic acid | 50 gm. |
| Microcrystalline cellulose NF | 120 gm. |
| Starch | 16 gm. |
| Magnesium stearate powder | 4 gm. |

The ingredients are screened and blended together and pressed into 50 mg. tablets.

The tablets are useful to protect against food allergy at a dose of 1 tablet before meals.

EXAMPLE 4

A sterile preparation suitable for intramuscular injection and containing 10 mg. of 3-fluoro-4-phenyl-hydratropic acid in each milliliter is prepared from the following ingredients:

| | |
|---|---|
| 3-fluoro-4-phenyl-hydratropic acid | 10 gm. |
| Benzyl benzoate | 200 ml. |
| Methylparaben | 1.5 gm. |
| Propylparaben | 0.5 gm. |
| Cottonseed oil q.s. | 1,000 ml. |

One milliliter of this sterile preparation is injected for prophylactic treatment of allergic rhinitis.

EXAMPLE 5

Aqueous Solution 600 ml. of an aqueous solution containing 60 mg. of sodium salt of 3-fluoro-4-phenyl-hydratropic acid is prepared as follows:

| | |
|---|---|
| Sodium salt of 3-fluoro-4-phenyl-hydratropic acid | 60 mg. |
| Sodium chloride | 5,400 mg. |
| Water for injection q.s. | 600 ml. |

The sodium chloride and 3-fluoro-4-phenyl-hydratropic acid are dissolved in sufficient water to make 600 ml. and sterile filtered.

The solution is placed in nebulizers designed to deliver 0.25 ml. of solution per spray.

The solution is sprayed (inhaled) into the lungs every 4 hours for prevention of asthmatic attacks.

EXAMPLE 6

Powder for Insufflation

A powder mixture consisting of 100 mg. of 3-fluoro-4-phenyl-hydratropic acid and sufficient lactose to make 5 gm. of mixture is micropulverized and placed in an insufflator designed to deliver 50 mg. of powder per dose.

The powder is inhaled into the lungs for prevention of asthmatic attacks.

EXAMPLE 7

Aerosol

Twelve grams of an aerosol composition is prepared from the following ingredients:

| | | |
|---|---|---|
| 3-fluoro-4-phenyl-hydratropic acid | 2.0 | gm. |
| Absolute ethanol | 4.855 | gm. |
| Freon 12 | 1.43 | gm. |
| Freon 114 | 5.7 | gm. |

The 3-fluoro-4-phenyl-hydratropic acid is dissolved in the ethanol and chilled to $-30°$ C. and added to the chilled Freons. The 12 grams of composition is added to a 13 cc. plastic coated bottle and capped with a metering valve. The metering valve releases 80 mg. of composition in an aerosol.

The aerosol is inhaled every 6 hours for prevention of asthmatic attacks.

EXAMPLE 8

Following the procedure of the preceding Examples 1, 2, 3, 4, 6, and 7, inclusive, substituting an equimolar amount of each of 3-chloro-4-cyclohexyl-hydratropic acid, 3-bromo-4-phenyl-hydratropic acid, 4-(o-fluorophenyl)-hydratropic acid, 4-cyclohexyl-hydratropic acid, 4-cyclohexyl-3-fluorohydratropic acid, 4- cyclohexyl-3-methylhydratropic acid, 4-cyclohexyl-3-ethylhydratropic acid, 4-cyclohexyl-3-methoxyhydratropic acid, 4-cyclohexyl-3-ethoxyhydratropic acid, 3-chloro-4-phenyl-hydratropic acid, 3-methyl-4-phenyl-hydratropic acid, 3-methoxy-4-phenyl-hydratropic acid, 3-ethyl-4-phenyl-hydratropic acid, 3-ethoxy-4-phenylhydratropic acid, 3-fluoro-4-(o-fluorophenyl)hydratropic acid, 4-(p-chlorophenyl)hydratropic acid, 4-(p-ethoxyphenyl)-hydratropic acid, 4-(p-methylphenyl)hydratropic acid, 4-(m-chlorophenyl)hydratropic acid, 4-(o-chlorophenyl)hydratropic acid, 4-(p-fluorophenyl)hydratropic acid, 3-bromo-4-(o-bromophenyl)hydratropic acid, and 4-(o-bromophenyl)hydratropic acid for the 3-fluoro-4-phenylhydratropic acid of the example, compositions are similarly prepared.

EXAMPLE 9

Following the procedure of the preceding Example 4, substituting an equimolar amount each of the sodium, potassium or ammonium salts of the compounds of Example 8 for the compound of Example 4, compositions are similarly prepared.

I claim:

1. A process for the prophylactic treatment of allergy of a reagin or non-reagin mediated nature comprising the systemic administration of from 15 to 200 mg. of a compound of the formula:

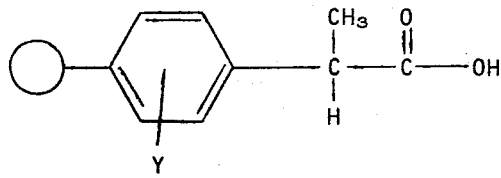

wherein

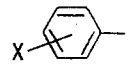

is cyclohexane or and X and Y can be the same or different and are hydrogen, fluoro, chloro, bromo, alkyl of from 1 to 8 carbon atoms, inclusive, or alkoxy of from 1 to 8 carbon atoms, inclusive, or the pharmacologically acceptable salt thereof in association with a pharmaceutical carrier to a sensitized human or animal subject.

2. The process of claim 1 wherein the compound selected is the *d* or *dl* form of 3-fluoro-4-phenylhydratropic acid.

3. The process of claim 1 wherein the compound selected is the *d* or *dl* form of 3-chloro-4-cyclohexylhydratropic acid.

4. The process of claim 1 wherein the compound selected is the *d* or *dl* form of 3-bromo-4-phenylhydratropic acid.

5. The process of claim 1 wherein the compound selected is the *d* or *dl* form of 4-(o-fluorophenyl)-hydratropic acid.

* * * * *